United States Patent [19]

Noble, Jr.

[11] Patent Number: 5,554,420

[45] Date of Patent: *Sep. 10, 1996

[54] DECORATIVE DISPLAY DEVICE

[76] Inventor: John T. Noble, Jr., 710 River Knoll Dr., Marietta, Ga. 30067

[*] Notice: The term of this patent shall not extend beyond the expiration date of Pat. No. 5,037,679.

[21] Appl. No.: 180,143

[22] Filed: Jan. 11, 1994

[51] Int. Cl.⁶ .................................................. B44C 5/04
[52] U.S. Cl. ........................................ 428/10; 428/542.8
[58] Field of Search .................................... 428/7, 10, 13, 428/542.8

[56] References Cited

U.S. PATENT DOCUMENTS

| D. 84,281 | 6/1931 | Frei | D11/120 |
|---|---|---|---|
| D. 91,549 | 2/1934 | Tremper | D11/120 |
| D. 168,961 | 3/1953 | Melaragno | D11/120 |
| D. 206,124 | 11/1966 | Burnbaum | D11/120 |
| 1,617,188 | 2/1927 | Woerner | 428/10 X |
| 1,696,221 | 12/1928 | Tubbs | 428/10 X |
| 2,033,173 | 3/1936 | Barocas | 428/10 X |
| 2,086,958 | 7/1937 | Pollock | 428/10 X |
| 2,682,727 | 7/1954 | Keljik | 428/13 X |
| 2,761,233 | 9/1956 | Brown | 428/10 X |
| 2,831,963 | 4/1958 | Kurianski | 428/13 X |
| 3,350,555 | 10/1967 | DiRico | 428/10 X |
| 3,500,035 | 3/1970 | Franc | 428/10 X |
| 3,591,442 | 7/1971 | Matesi | 428/10 |
| 3,614,840 | 10/1971 | Vadell | 428/13 |
| 3,701,207 | 10/1972 | Conrad | 428/13 X |
| 4,100,316 | 7/1978 | Lackey | 428/10 |
| 4,353,327 | 10/1982 | Shroyer | 428/13 X |
| 4,525,393 | 6/1985 | DiCostanzo | 428/7 |
| 5,037,679 | 8/1991 | Noble, Jr. | 428/10 |

*Primary Examiner*—Henry F. Epstein
*Attorney, Agent, or Firm*—Hopkins & Thomas

[57] ABSTRACT

A kit for assembly into a display device has first and second plates adapted to be mounted and fixed in spaced relationship to each other. Each of the plates has a transverse slot therein which slots are aligned when the plates are in their fixed position. A floor member is adapted to be passed through the transverse slots and pins are provided for holding the floor member in place. A bracing member is adapted to bear against the under side of the floor plate and the front surface of the first plate.

12 Claims, 3 Drawing Sheets

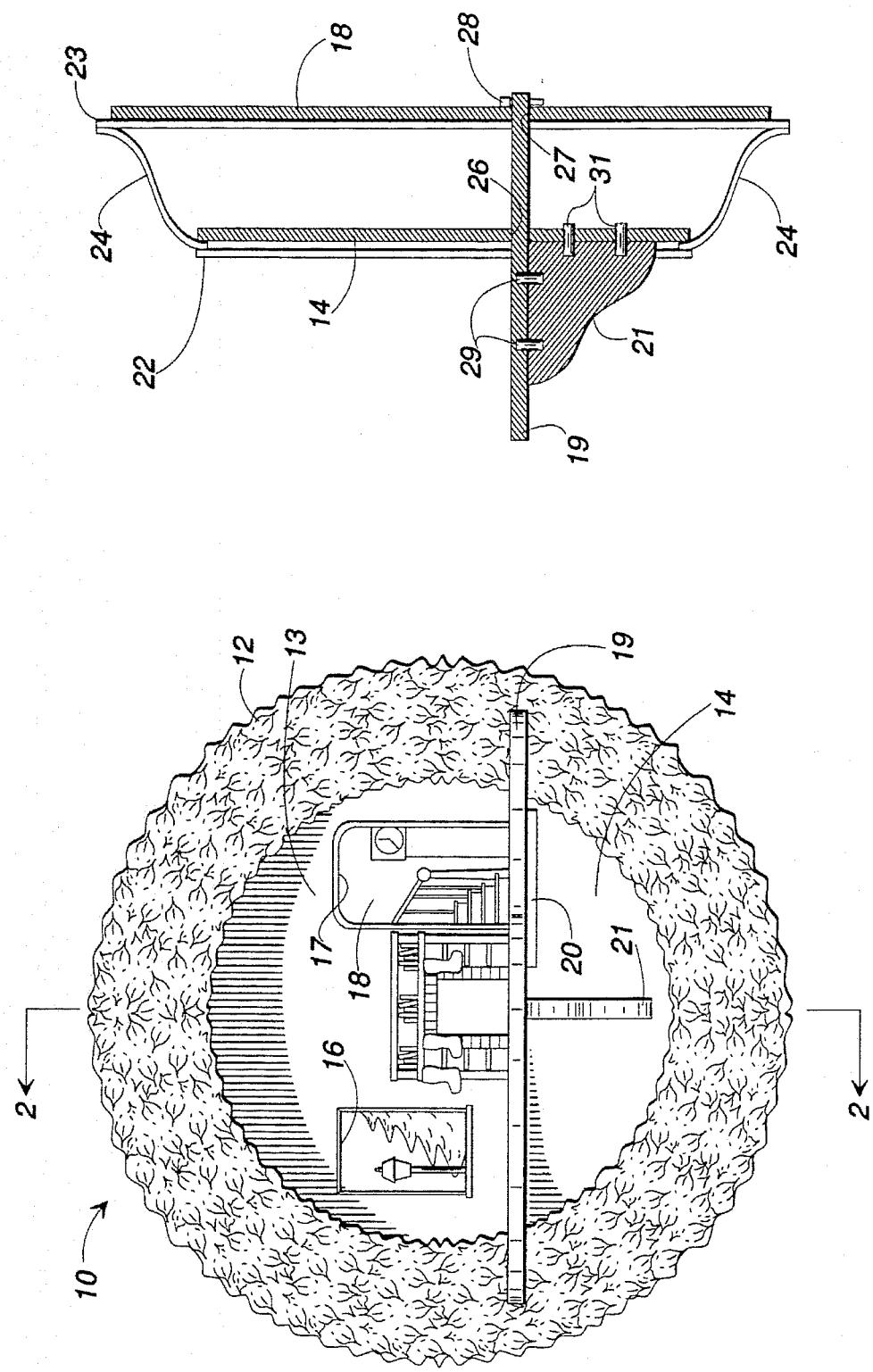

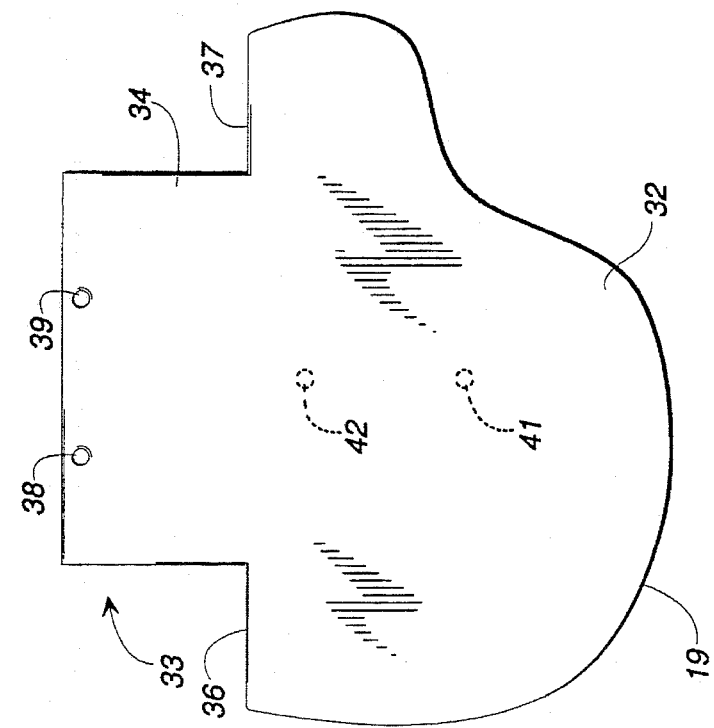

DECORATIVE DISPLAY DEVICE

FIELD OF INVENTION

This invention relates to decorative display devices and, more particularly, to a decorative display kit for constructing such devices and enhancing their appearance.

BACKGROUND OF THE INVENTION

Decorative display devices for use in the home or in a commercial environment are quite popular. Such devices are often used in the home to depict religious themes, or other scenes appropriate to festive occasions, such as Thanksgiving or Christmas. In a commercial milieu, such devices are used for advertising purposes or to display products or pictures thereof in a pleasant and attention getting manner.

In U.S. Pat. No. 5,037,679 of Noble, Jr. there is shown a three-dimensional decorative display device in the form of a wreath, but which is adaptable to other forms or types of devices which have a frame or frames defining an open space or area which is occupied by a three-dimensional scene. In the illustrative embodiment in that patent, the scene has a Christmas motif. The invention of that patent includes an annular form or frame upon which is arrayed suitable greenery or other decoration appropriate to the motif. A first plate member, the front surface of which has thereon an exterior scene such as, for example, the exterior of a house with cut out windows and doors, is mounted to the annular form and substantially fills the spaced defined thereby. A second plate member, spaced from the first plate member, is also mounted to the annular form or frame. The front surface of the second plate member has thereon an interior scene which may be painted on the surface or built up from individual component pieces, as may be the scene on the first plate. As assembled, the interior of the house, for example, may be viewed through the windows and door on the first plate. For added realism, the spacer member which separates the first and second plates may be painted to resemble the floor of the house.

The interior of the house may be illuminated by one or more miniature light bulbs mounted on, for example, the rear of the first plate preferably in locations that prevent the bulbs themselves from being seen in the assembled device. The display device of the patent is made up of a fairly large number of component parts, and care must be used during assembly to achieve the proper location and relationship of the parts.

There are numerous other prior art arrangements for decorative display devices such as are shown in U.S. Pat. Nos. 2,682,727 of Keljik, 2,831,963 of Kuriauskis, 3,500,035 of Franc, 3,614,840 of Vadell, and 4,353,327 of Shroyer, most of which are somewhat elaborate in design, and not readily amenable to easy assembly.

Wreath type display devices are shown in U.S. Pat. Nos. 1,696,221 of Tubbs, 2,033,173 of Barocas, 2,086,958 of Pollock, 2,761,233 of Brown, 3,350,555 of DiRico, 3,591,442 of Matesi, and 4,100,316 of Lackey. Of these patents, the Brown, DiRico, and Barocas patents disclose methods of assembling the wreath on a frame or form, and providing illumination for the end product. Only Brown, however, has a scenic depiction, a two dimensional scene, filling the open area defined by the wreath. The Tubbs, Matesi, and Lackey patents are directed more to the frame or form for use in assembling a wreath.

None of the aforementioned prior art references discloses an arrangement such as is shown in the Noble, Jr. patent, nor do any of the references disclose an arrangement for decorating a pre-existing wreath, for example, with a three dimensional display that is easily assembled and mounted to the wreath in the open space defined thereby. Nor does the prior art disclose a kit of component parts so configured that assembly into a decorative display device is easily accomplished.

SUMMARY OF THE INVENTION

The present invention is directed to a kit arrangement having a plurality of component parts so configured as to make their assembly into a decorative display device such as that shown in the aforementioned Noble, Jr. patent a relatively simple matter that requires little skill or mechanical aptitude. While the principals and features of the invention are applicable to numerous types of displays, these features will be disclosed as applied to a Christmas wreath.

In the preferred embodiment of the invention, a wire frame member, preferably of annular form, and defining and surrounding an open area has a front portion of a first diameter and a rear portion of a second, larger, diameter, with the two portions spaced from each other. A first plate member having a diameter slightly greater than the first diameter is insertable into the frame to rest against the rear of the front portion to which it is adapted to be affixed by suitable attaching means such as twisted wires extending through holes in the plate member and around the wire forming the front portion of the frame. A second plate member having a diameter sufficient to rest against the rear of the rear portion of the frame, hence greater than the diameter of the front plate member, is adapted to be affixed to the wire forming the rear portion of the frame by suitable means such as twisted wires extending through holes in the plate member and around the wire of the frame. The configuration of the frame is such that the rear surface of the first plate and the front surface of the second plate are, when affixed, spaced from each other.

For decorative purposes, as in a Christmas wreath, for example, the front plate member has a scene thereon, either painted, printed, or built up, of, for example, the interior of a room with a fireplace. A first cut-out portion in the form of a window is on one side of the fireplace, and a second cut out portion in the form of a door is on the other side of the fireplace. The scene thus depicted faces to the front of the frame, and hence the wreath, so that it is visible to viewers looking at the wreath. The second plate, in one example, has two scenes on the front face thereof, one of which is visible through the window in the first plate and the other of which is visible through the door in the first plate. For example, the scene visible through the window can be of a snow covered landscape and the scene visible through the door can be an interior staircase ascending to an imaginary second floor.

The first plate has a transverse slot cut therein below the fireplace, for example, and the second plate has a corresponding slot cut therein directly in line with the first slot when the plates are in their fixed, spaced position. A substantially flat floor member having a transverse dimension sufficient to extend to the limits of the visible portion of the scene on the first plate, and having a rear extended tongue portion forming shoulders with the main front portion of the floor member is adapted to be mounted to the first and second plates and extend outwardly from the front surface of the first plate. The floor member is mounted by insertion of the tongue portion through the slots in the first and second plates, and is affixed in place by insertion of elongated pins through holes in the distal end of the tongue portion, which pins are adapted to bear against the rear surface of the second plate. For decorative purposes, the top surface of the floor member may have painted, printed or scribed thereon the appearance of a tile or hardwood floor, for example.

A floor bracing member is adapted to fit under, and bear against, the lower surface of the floor member and to bear against the lower portion of the front surface of the first plate. The bracing member can be affixed in place by means of dowels or pins extending into the floor member and the first plate, by gluing, especially where the wreath is being permanently assembled, or by twisted wires extending through holes in the bracing member and in the first plate. In addition, a floor extension member may be added which can be affixed to the lower surface of the floor member as by gluing.

After the parts have been assembled, as described in the foregoing, the wire frame may be covered with suitable decorative material such as typical evergreen sprays, holly, or other material suitable to the occasion being celebrated. In addition, the floor piece and the bracing member, which is preferably made of one-half inch thick laminated pressboard, have exposed edges which may be painted or covered with decorative material, such as fabric tape, to produce a more pleasing appearance.

These and other features of the present invention will be more readily apparent from the following detailed description, read in conjunction with the accompanying drawings.

BRIEF DESCRIPTION OF THE DRAWINGS

FIG. 1 is an elevation view of a decorative display device assembled from the component parts contained in the kit;

FIG. 2 is an elevation view in cross-section taken along the line I—I of FIG. 1;

FIG. 3 is a plan view of the floor piece component of the kit;

FIG. 4A, 4B, and 4C are views of the floor bracing member component of the kit.

DETAILED DESCRIPTION

Figure 5:
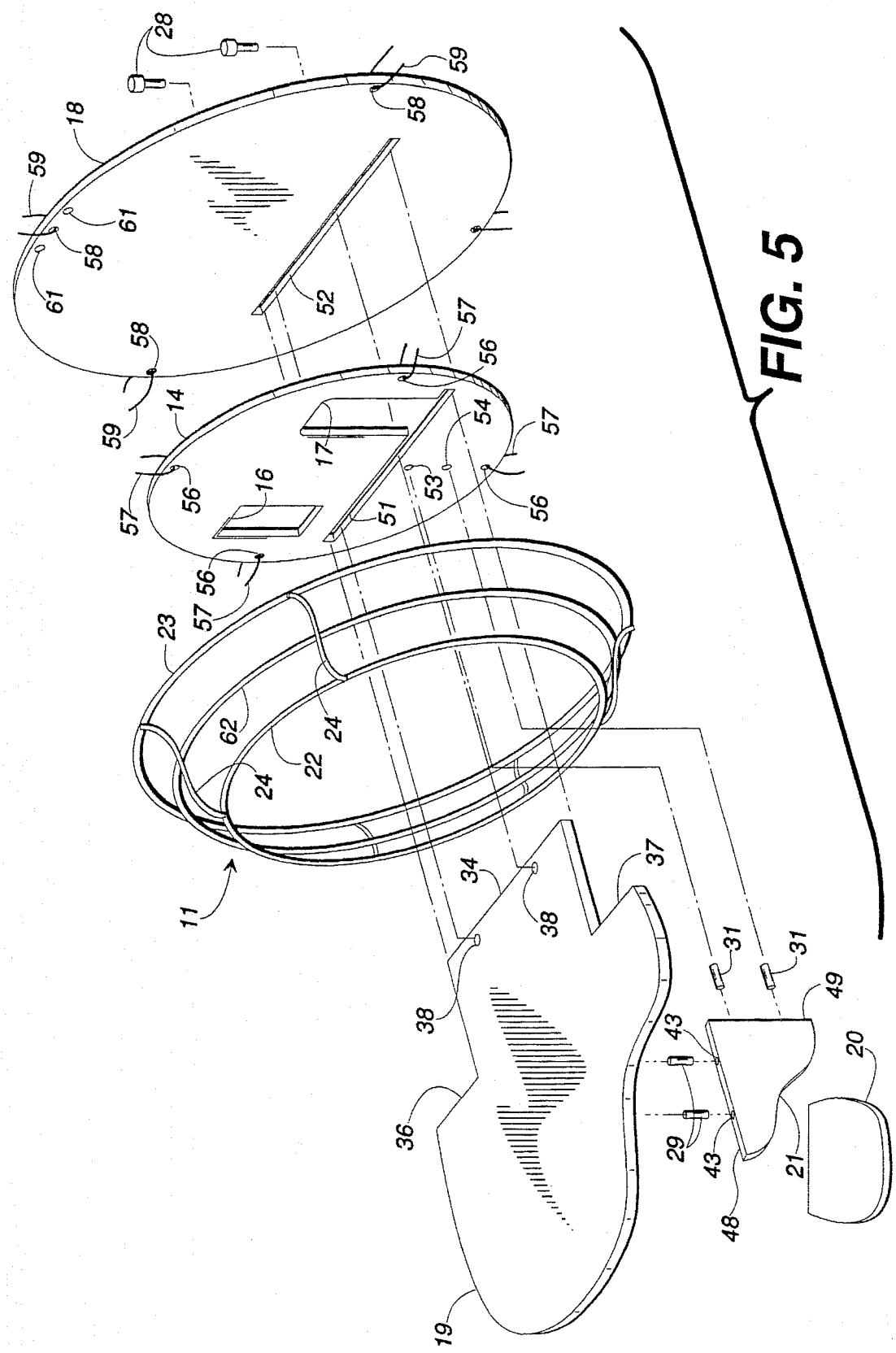
FIG. 5 is an exploded, perspective view of the components of the kit and there relationship to each other in the assembly of the decorative device.

FIG. 1 depicts an assembled Christmas wreath 10 mounted on a frame 11, not shown in FIG. 1, and encircled by suitable decorative foliage or other greenery 12, affixed to the frame. The frame 11 and greenery 12 define a large circular open area 13. As viewed in FIG. 1, a front plate 14, preferably of laminated pressboard, has, on the front, visible face thereof a decorative scene such as a room in a home, with a fireplace and bookshelves. Plate 14 has a first cut-out portion 16 configured as a window and a second cut-out portion 17 configured as a door. A second or rear plate 18, also of laminated pressboard, is located behind plate 14, and, as will be apparent hereinafter, is spaced therefrom. In keeping with the Christmas motif, plate 18 has a first decorative scene on the front face thereof depicting a snowy landscape with lamp and tree that is visible through window 16. Plate 18 also has a second decorative scene on its front face depicting a portion of the interior of the house, showing stairs and a grandfather clock. A flat floor member 19 is mounted on or in plates 14 and 18, in a manner that will be apparent hereinafter, and its top surface may be painted, printed, or scribed to resemble a hardwood, tile, or other type floor. An auxiliary floor piece 20 may, if desired, be mounted to the underside of floor member 19. A floor support or bracing member 21 is mounted under floor member 19 and bears against the bottom surface thereof and also bears against the front face of plate 14.

In FIG. 2, which is a cross-sectional view of the wreath 10 of FIG. 1, but with the foliage 12 removed, the positions and relationships of the various components may be readily seen. Frame member 11, which is annular in form comprises a first or front ring portion 22, preferably of heavy gauge, metal wire, having a first diameter, and a second or rear ring portion 23 of a larger diameter than ring 22. Rings 22 and 23 are held in fixed, spaced relationship by a plurality of legs 24,24 which are affixed to both rings 22 and 23 as by welding or soldering. The front surface of plate 14, which has a diameter approximately equal to or slightly greater than ring 22, rests against extended portions of legs 24,24, as shown, and is affixed thereto by a suitable holder such as twisted wires, not shown, which pass through holes in front plate 14 and around adjacent portions of frame 11. Rear plate 18, which has a diameter greater than front plate 14 and slightly less than ring 23, rests against extended portions of legs 24. In practice, plate 18 may have a diameter slightly greater than that of ring 23, in which case it would rest against the rear of ring 23. Plate 18 is likewise mounted and held in place by a suitable holder such as twisted wires, not shown, which pass through holes in plate 18 and around adjacent portions of frame 11. Thus plates 14 and 18, when mounted on frame 11, are spaced from each other in fixed relationship, as shown in FIG. 2. Floor member 19 extends through a slot 26 in front plate 14 and a slot 27 in rear plate 18, and is held in place by headed pegs or pins 28,28, which may be made of wood, for example, and, when in place, bear against the rear surface of rear plate 18. Floor bracing member 21 bears against the bottom surface of floor member 19 and the front surface of front plate 14, as shown, being located and held in place by pins 29,29 and 31,31 which, as will be discussed hereinafter are insertable into holes drilled in floor member 19, front plate 14, and bracing member 21. Alternatively, bracing member 21 may be glued to the bottom side of member 19 and the front face of plate 14. However, such an arrangement prevents, or at least, makes difficult, the dis-assembly of the wreath into its component parts for storage or transport. Thus, the arrangement shown in FIG. 2, or some similar arrangement, is much to be preferred, in that the wreath may be assembled and dis-assembled any number of times.

FIG. 3 is a plan view of floor member 19, shown with its top surface having a pattern of lines resembling a tile floor. As pointed out hereinbefore, other patterns may be used, such as for a hardwood floor, or even a carpeted floor. For decorative purposes, the front portion 32 of floor member 19, which extends outward from front plate 14, is contoured as shown, and is transversely dimensioned to extend past the edges of plate 14, as shown in FIG. 1. The rear portion 33 of member 19 is a tongue member 34, preferably rectangular in shape, with a transverse dimension less than the transverse dimension of front portion 32, thereby forming shoulders 36 and 37, which are adapted to bear against the front surface of front plate 14. At the rear of portion 34 are first and second holes 38 and 39 for receiving pins 28,28 as is shown in FIG. 2, and as will be discussed more fully hereinafter. Holes 41 and 42 are drilled into the bottom side of member 14 for receiving pins 29,29, as shown in FIG. 2.

FIG. 4A is a side elevation view of bracing member 21, FIG. 4B is a plan view of the top of member 21, and FIG.

4C is an elevation view of the rear of member 21. As can be seen, member 21 has first and second spaced holes 43 and 44 drilled in the top thereof for receiving pins 29,29, which are a mild press fit therein. Spaced holes 46 and 47 are also drilled into the rear of member 21 for receiving pins 31,31, which are also a mild press fit therein. The top surface 48 of member 21 when in its assembled position, bears against the bottom side of floor member 19, as best seen in FIG. 2. Also, as best seen in FIG. 2, the rear surface 49 of member 21 bears against the front surface of plate 14 in the assembled position.

Both floor member 19 and bracing member 21 are preferably made of three-eighths inch (⅜) thick laminated pressboard, although other materials such as wood or plastic might also be used. As a consequence, ⅜ inch edges on the contoured portions of both members 19 and 21 are clearly visible to one viewing the wreath from the front. These edges may be painted or otherwise decorated, as by multicolored fabric tape, for example, to present a more pleasing appearance. Pressboard is a desirable material both for its strength, rigidity, and light weight, however, any or all of the components herein described as being made of pressboard might be made from other suitable materials, such as wood or plastic, for example.

FIG. 5 is a perspective exploded view of the components of the kit which illustrate their relationship to each other, and also indicates the method of assembling the components of the kit into a decorative display device. It can be seen that front plate 14 has a transverse slot 51 extending therethrough at the base of door cut-out 17 which is dimensioned to receive and pass tongue 34 of member 19. Plate 18 also has a similar transverse slot 52 extending therethrough which, when plates 14 and 18 are fixed in position on frame 11, is aligned with slot 52. Front plate 14 also has a pair of holes 53 and 54 drilled therethrough for receiving pins 31,31 which preferably are a mild press fit therein. By mild press fit, it is meant that the pins fit snugly within the holes, with little or no tendency to slip out, but can be pulled out by hand or a simple grasping tool. Adjacent the periphery of plate 14 and spaced therearound are a plurality of holes 56,56 adapted to receive twistable wire fasteners 57,57. In like manner, plate 18 has a plurality of holes 58,58, for receiving twistable wire fasteners 59,59. Plate 18 also has a pair of holes 61,61, which are available to the user for hanging the assembled wreath, if desired.

In assembling the display device, plate 14 is inserted into frame 11 with its decorative portion facing the front, or towards the left as viewed in FIG. 5, to rest against the extended portions of legs 24, as is shown in FIG. 2. Plate 14 is then fixed in place by wires 57,57 wrapped around the adjacent portions of frame 11 and twisted to hold the plate 14 tightly in position. Plate 18, with its decorative surface also facing to the front is then positioned to rest against the extended portions of legs 24, or against an additional ring strengthening member 62, and is fixed in place by twisted wires 59,59. It is to be understood that the twisted wires are a preferred arrangement for fixing plates 14 and 18 in place on the frame 11, but that other holding or affixing device, such as clips, might be used instead. When in place in frame 11, plates 14 and 18 are spaced apart so that their scenic depictions create a three-dimensional effect for the viewer.

After plates 14 and 18 are in place, the tongue 34 on floor member 19 is inserted into and through slots 51 and 52 until shoulders 36 and 37 bear against the front surface of plate 14, and pins 28,28 are inserted into holes 38 and 39 where they bear against the rear surface of plate 18, thereby holding member 19 firmly in place. Pins 29,29 are then inserted into holes 43,43 in bracing member 21, and member 21 is then pressed upward to bear against the bottom or under side of member 19, with pins 31,31 located in holes 41 and 42 in the under side portion of member 19. For appearance sake, holes 41 and 42 do not extend through member 19, but only about half-way through the thickness thereof, sufficient to receive and hold pins 29,29 which are a mild press fit in holes 41 and 42. When member 21 is thus positioned, its rear surface 49 bears against the front surface of plate 14, with holes 46 and 47 aligned with holes 53 and 54 respectively. Pins 31,31 are then inserted into the holes from the rear of plate 14 to hold member 21 firmly in place. Auxiliary floor piece 20 may, if desired, be mounted to the underside of floor member 19 in any suitable manner, such as, for example, with glue or cement.

The component parts, when assembled as indicated with respect to FIG. 5, result in a display device for use as discussed hereinbefore. Thus, the device need not be for commemorating a festive occasion, such as Christmas, but may, instead, be used for advertising or display purposes. In some uses, the annular frame may not be necessary or desirable, and may be omitted so long as the plates 14 and 18 may be connected to a pre-existing form in fixed spaced relationship. In addition, the aforementioned U.S. Pat. No. 5,037,679 of Noble, Jr. discloses a two-side wreath in addition to the more conventional one-sided wreath. A two sided wreath can readily be constructed through the use of two of the kits of the invention, with, perhaps, some modification of the parts illustrated in FIG. 5.

The foregoing has been by way of illustrating the principles and features of the invention in a preferred embodiment thereof. Numerous changes or modifications may be made by those skilled in the art without departure from the spirit and scope of the invention.

I claim:

1. A kit for assembly into a display device, comprising:

a first plate member having a first transverse dimension and front and rear surfaces;

a second plate member having a second transverse dimension and front and rear surfaces;

means for attaching said first and second plate members in fixed, spaced relationship to a pre-existing form;

said first plate member having at least one aperture therein for viewing at least some portions of said second plate member when said plate members are in their fixed spaced relationship;

said first plate member having a first transverse slot therein and extending therethrough;

said second plate member having a second transverse slot therein and extending therethrough and so located as to align with said first slot when said plate members are in their fixed, spaced relationship;

a floor member having a front portion and a rear portion and top and bottom surfaces, said rear portion being adapted to fit within and pass through said first and second slots;

means for holding said floor member in position relative to said first and second plate members when said rear portion is positioned within said slots; and means adapted to bear against said bottom surface of said floor member and said front surface of said first plate member for supporting said floor member when said floor member is held in position relative to said first and second plate members.

2. A kit for assembly into a display device as claimed in claim 1, wherein said first plate member and said second plate member are circular, the diameter of said second plate member being greater than the diameter of said first plate member.

3. A kit for assembly into a display device as claimed in claim 1, wherein a length of said first and second transverse slots is less than the first and second transverse dimensions.

4. A kit for assembly into a display device as claimed in claim 1, wherein said front portion of said floor member has a third transverse dimension sufficient to extend across said first plate member, and said rear portion of said floor member comprises a tongue having a distal end and having a transverse dimension substantially equal to a transverse dimension of said first and second slots.

5. A kit for assembly into a display device as claimed in claim 4, wherein said means for holding said floor member in position comprises at least one hole drilled in the distal end of said tongue, and a pin member adapted to be inserted in said hole and bear against the rear surface of said second plate member.

6. A kit for assembly into a display device as claimed in claim 1, wherein said means adapted to bear against said bottom surface is a bracing member having a first surface adapted to bear against the bottom surface of said floor member and a second surface adapted to bear against the front surface of said first plate member.

7. A kit for assembly into a display device as claimed in claim 6, further comprising means for maintaining said bracing member in fixed position against said floor member and said first plate member.

8. A kit for assembly into a display device, comprising:
a frame member comprising a front portion and a rear portion, said rear portion having a larger transverse dimension than said front portion, said frame member having means connecting said front and rear portions in fixed spaced relationship;
a first plate member adapted to be mounted in said frame member at the front portion thereof, said first plate member having front and rear surfaces and being adapted to having its front surface rest against said front portion of said frame member;
means for affixing said first plate member to said frame member;
a second plate member having front and rear surfaces and being adapted to having its front surface rest against said rear portion of said frame member whereby said first and second plate members are spaced from each other when positioned to rest against said frame member;
means for affixing said second plate member to said frame member;
said first plate member having a transverse slot extending therethrough;
said second plate member having a transverse slot extending therethrough;
a floor member having a front portion with a first transverse dimension and a rear portion with a second transverse dimension less than the first transverse dimension, said rear portion forming a tongue having a distal end adapted to be inserted through said transverse slots in said first and second plate members; and
means for holding said floor member in place when said distal end is inserted through said transverse slots.

9. A kit for assembly into a display device as claimed in claim 8, wherein said means for holding said floor member in place comprises at least one hole drilled through said distal end of said rear portion, and a pin member adapted to be inserted in said hole and adapted to bear against the rear surface of said second plate member.

10. A kit for assembly into a display device as claimed in claim 8, further including a bracing member adapted to bear against a bottom surface of said floor member and the front surface of said first plate member.

11. A kit for assembly into a display device as claimed in claim 10, further including fixing means for affixing said bracing member in place against said floor member and said first plate member.

12. A kit for assembly into a display device as claimed in claim 11, wherein said fixing means comprises a first pin member adapted to be inserted in said bracing member and said floor member, and a second pin member adapted to be inserted through said first plate and into said bracing member.

* * * * *